United States Patent

[11] 3,586,976

| [72] | Inventor | Henry R. Woolner<br>Manchester, N.H. |
|---|---|---|
| [21] | Appl. No. | 850,509 |
| [22] | Filed | Aug. 15, 1969 |
| [45] | Patented | June 22, 1971 |
| [73] | Assignee | Modutec Incorporated<br>Norwalk, Conn. |

[54] TORSION BAND SUSPENSION FOR ROTATABLE ELECTRICAL INSTRUMENT
21 Claims, 5 Drawing Figs.

| [52] | U.S. Cl. | 324/154 |
|---|---|---|
| [51] | Int. Cl. | G01r 1/00 |
| [50] | Field of Search | 324/154 |

[56] References Cited
UNITED STATES PATENTS
3,490,043  1/1970  Faria........................... 324/154 X

*Primary Examiner*—Alfred E. Smith
*Attorney*—James and Franklin

ABSTRACT: A rotor is mounted for rotation with respect to a stator by a torsion band formed of a relatively hard material secured to and tensioned between rotor and stator mounting elements. One of these mounting elements has a part formed of a relatively soft and self-sustaining material. The band is urged against the soft material part with a force sufficient to cause the band to form a recess in the soft material part. The band is snugly received in that self-formed recess to ensure accurate rotational positioning of the rotor.

PATENTED JUN 22 1971

INVENTOR
HENRY R. WOOLNER
BY
James and Franklin
ATTORNEY

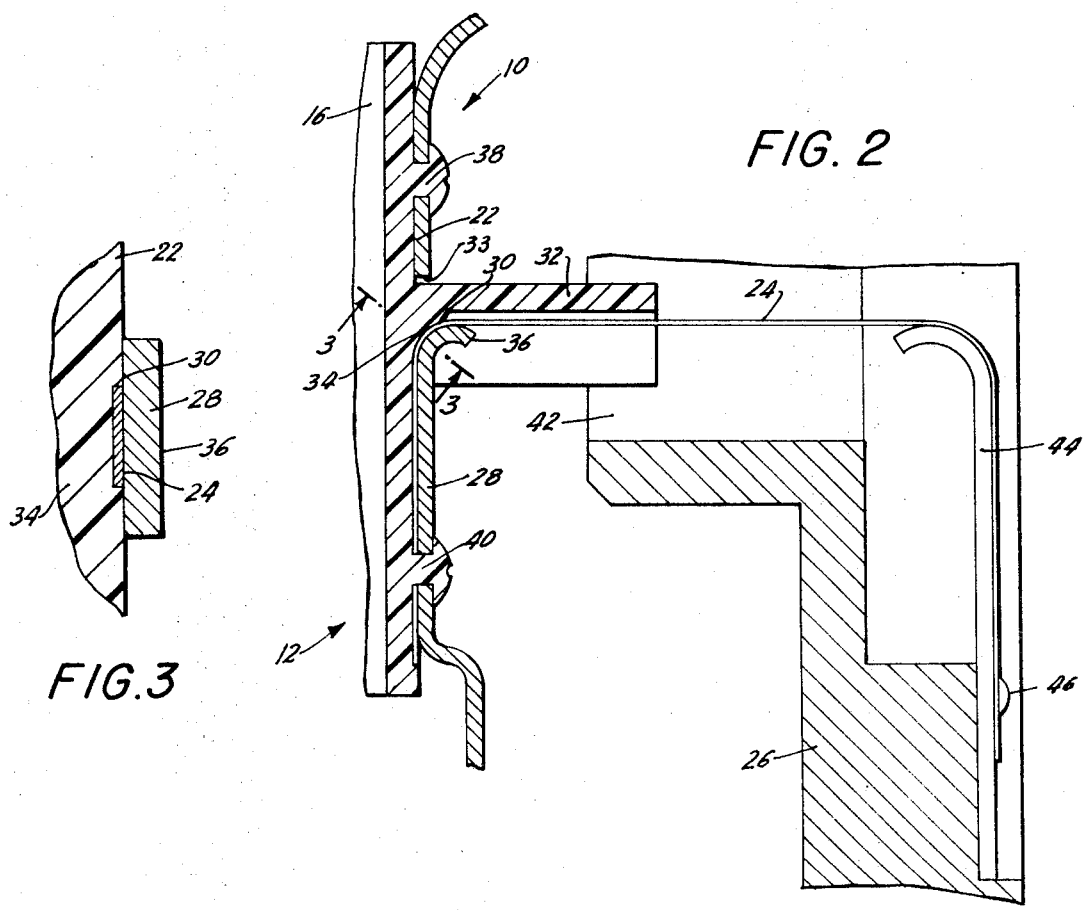
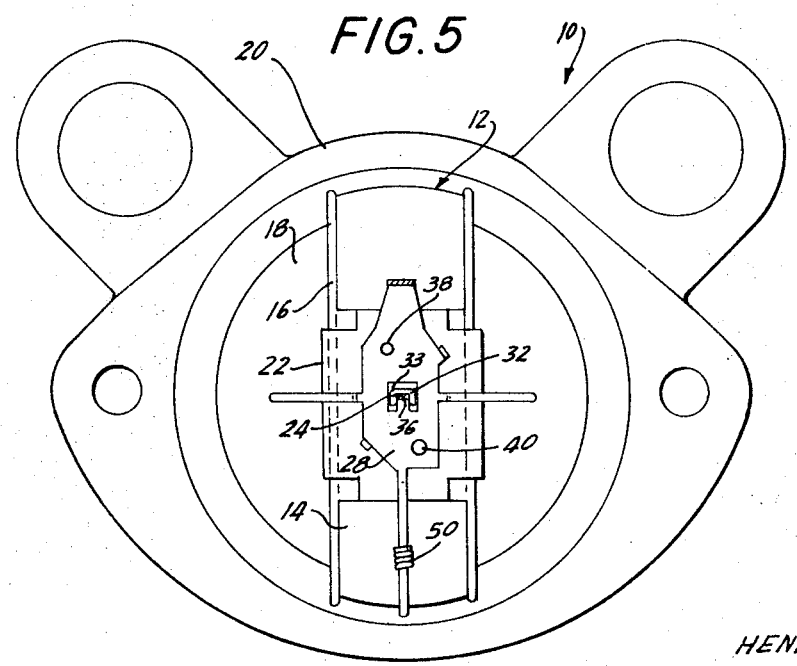

TORSION BAND SUSPENSION FOR ROTATABLE ELECTRICAL INSTRUMENT

The present invention relates to electrical instruments having a rotatable element or rotor, and particularly to an improved suspension system for mounting that rotatable element.

In the construction of electrical measuring instruments, such as galvanometers, a rotatable element or rotor is mounted for relative rotation with respect to a stationary element or stator. The extent of the relative rotation of the rotatable element is determined by the magnitude of an input electrical signal and thus provides an indication of the magnitude of that signal. For that indication to be accurate, it is essential that the rotation of the rotor be precisely controlled so that it reflects only the magnitude of the input electrical signal.

One of the most commonly used electrical measuring instruments is the D'Arsonval galvanometer which, although relatively simple in construction, is capable of measuring currents with a high degree of sensitivity and accuracy. In this instrument the rotatable element is in the form of a coil which is rotatably mounted in the magnetic field of a stationary magnet which may be of the permanent type. The coil is suspended by a filar element which is commonly in the form of thin, flat band capable of being twisted.

The band is effective to provide a restoring torque to the coil when the latter is deflected (i.e. rotated) away from its normal or zero position, and may also serve as one of the current leads to the coil.

When a current is caused to flow through the coil an electromagnetic field is produced about the coil which interacts with the magnetic field of the stationary magnet to produce a couple around the axis of the coil, causing the latter to rotate. The final end position of the coil is established when the net restoring torque exerted by the twisted band equals the deflecting magnetic torque active on the coil. This final position of the coil thus indicates the magnitude of the coil current. When the input current signal is removed from the coil, the forces active thereon are removed and the torque exerted by the twisted band causes the coil to return to its normal or rest position.

To ensure that the coil is reliably and accurately positioned each time an input signal is applied and that it always returns to its zero position when the input signal is removed, it is necessary that there be no relative motion between the band and the rotor. Any such relative motion would produce significant coil positional errors and thus give rise to erroneous instrument readings.

It is in this area that the known band suspension electrical instruments (e.g., D'Arsonval galvanometers) have been deficient. In these instruments the torsion band for an appreciable length extends over a rotor surface to point on the coil at which it is secured such as by soldering or welding. While the securing of the band to the coil fixes the band at that end point, the band can still shift laterally along that rotor surface as a result of gravity, shock or vibration, for instance, and when such shift takes place the relative position of rotor vis-a-vis band is changed. To prevent this relative movement between the band and the coil it has been proposed to form a groove or channel in the coil in which the band is received, or to provide spaced ribs on the coil between which the band is passed. For these expedients to succeed, it is critical that there be a precise correspondence between the width of the torsion band and the width of the groove (or the spacing between the ribs). If the width of the groove is greater than that of the band, the band is still able to slide from side to side within the groove, and if the groove is narrower than the band, the band is not completely received in the groove and stress is produced on the band which may result in the failure of the band, while shifting of the band and rotor is not positively prevented.

As a result the use of torsion band suspension systems in electrical measuring instrument has heretofore been limited to instruments having relatively coarse accuracy requirements, that is, instruments in which errors in the range of between 2 and 3 percent can be tolerated. However, the art has until now not been able to develop a band suspension type instrument, with its attendant features of simplicity and economy, for precision measuring instruments in which the margin of error is limited to approximately ½ percent. As stated above, this is due to the inability of the art to reliably prevent the relative movement of the torsion band with respect to the coil.

It is an object of the present invention to provide an electrical measuring instrument capable of operating with exceptionally high accuracy.

It is another object of the present invention to provide an electrical measuring instrument of the band suspension type in which undesired relative movement between the torsion band and the rotatable element in the instrument is substantially eliminated.

It is a further object of the present invention to provide an economical and yet reliable and exceptionally accurate electrical measuring instrument.

The electrical instrument with which the band suspension system of the present invention is incorporated comprises a rotor rotatably mounted on a stator, and means for causing the rotor to rotate relative to the stator. A part of a mounting element secured to the rotor is formed of a relatively soft and yet self-sustaining material. The band is formed of a relatively hard material and is urged against that soft-material part with a force sufficient to create a recess or groove in the soft-material part Since the groove is formed in situ it is perforce equal to the width of the band which forms it. The band is thus snugly received in the groove and the undesired sliding or relative motion between the band and rotor is effectively prevented in a manner which produces only negligible stress along the edges of the band.

The soft-material part may define an end-facing surface of the rotor. The means for urging the band against and into the soft-material part of the rotor mounting element may comprise a resilient member formed of a relatively hard material which is mounted on the end-facing rotor element. The band is pressed between the resilient member and the soft rotor surface and extends over an upper section of the member, and from there to a point on the stator at which it is secured.

The soft-material part may be formed of a plastic material and the band and the resilient member may be formed of a metallic material. The soft-material part and the resilient band urging member may each comprise adjacent arcuate segments between which the band passes.

To the accomplishment of the above, and to such other objects as may hereinafter appear, the present invention relates to a torsion band mounting system for an electrical instrument, as defined in the appended claims and as described in the specification, taken together with the accompanying drawings in which:

FIG. 2 is a fragmentary view, on an enlarged scale, of the right-hand portion of FIG. 1;

FIG. 3 is a cross-sectional view taken approximately along the line 3–3 of FIG. 3;

FIG. 5 is a cross-sectional view taken across the line 5–5 of FIG. 1.

Figure 4:
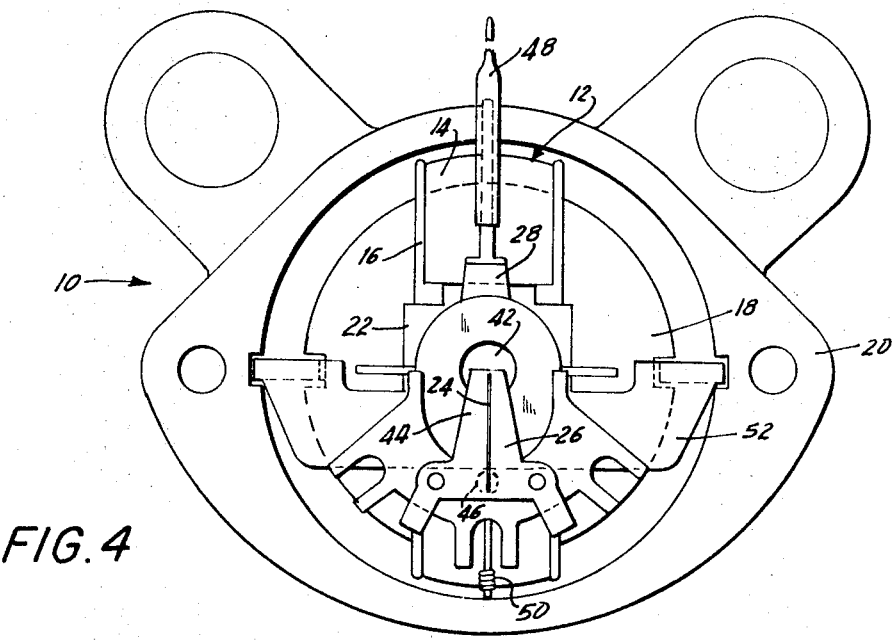
FIG. 4 is an end view of the electrical instrument of FIG. 1 taken in the direction of the arrows 4–4 of FIG. 1.

The electrical instrument suspension system of the present invention is shown herein in FIGS. 1—5 as incorporated in a D'Arsonval galvanometer generally designated 10. Galvanometer 10 comprises a rotor in the form of a coil assembly 12 which in turn comprises a plurality of turns of conducting wire 14 wound on a generally rectangular frame 16. Coil 12 is rotatably mounted in the magnetic field of a stationary permanent magnet 18. A pole piece 20 is formed of a magnetic material and may be arranged about magnet 18 to concentrate the magnetic field of the latter.

When an input signal or current is applied to coil assembly 12, it produces a magnetic field which interacts with the magnetic field produced by magnet 18 to produce a force on coil assembly 12 tending to cause it to pivot or rotate from its normal or zero position about its horizontal axis (as viewed in FIG. 1) with respect to the stationary magnet 18. It is desired that the final position of coil assembly 12 accurately correspond to the magnitude of the input signal applied thereto.

It is known to operatively connect the rotatable coil assembly to a stationary point by a relatively thin band or strip supported in tension which serves to limit the rotation of the coil and to exert a return or restoring torque on the coil when the test signal is removed therefrom. To achieve accurate and reliable control of the relative rotational position of coil assembly 12 it is essential that there be no relative (e.g. sliding) movement between the band and the coil assembly. It is to this problem that the present invention is directed.

In accord with the invention a mounting element in the form of an anchor plate 22 is secured in any appropriate manner to one end face of the coil assembly 12 as by being secured to frame 16. Anchor plate 22 is formed of a relatively soft, self-sustaining material such as a plastic. A relatively thin torsion band 24 formed of a relatively hard metallic material is secured at one of its ends to a stationary zero regulator assembly 26 and at its other end is operatively secured to the coil assembly 12 such as at anchor plate 22.

Means in the form of a balance cross 28 made of a resilient and relatively hard material is operatively secured to anchor plate 22, one end portion of band 24 being received between plate 22 and balance cross 28 as seen best in FIG. 2. Balance cross 28 presses against band 24 and urges it into the soft material of anchor plate 22 with a force sufficient to cause the band to press into the soft material of plate 22 and to form therein a recess or groove 30 (FIG. 3) into which a part of band 24 is snugly embedded. Since recess 30 is formed by the band 24 itself, its cross-sectional shape and width precisely correspond to the shape and width of the band. This correspondence between band 24 and recess 30 so formed in plate 22 ensures that there will be substantially no lateral movement (i.e., transverse to the recess) of the band in the recess, as is required for accurate rotational positioning of the coil assembly.

Anchor plate 22 comprises an arcuate horizontal extension 32 which passes through an opening 33 (FIG. 5) formed in balance cross 28. At the inner end of extension 32 an arcuate surface 34 is formed and a corresponding arcuate bend 36 is formed in balance cross 28 directly beneath extension 32 and the arcuate surface 34. The band 24 passes between arcuate surface 34 and arcuate bend 36 and is here pressed into the soft material of anchor plate 22.

Pins 38 and 40 project from anchor plate 22 above and below extension 32 respectively and pass through appropriate openings formed in balance cross 28. The outer ends of these pins are staked to reliably secure balance cross 28 to anchor plate 22, and to ensure that the former is accurately positioned with respect to the latter to ensure the formation of recess 30 by torsion band 24.

The lower left-hand end of torsion band 24 as viewed in FIG. 2 is secured by means such as soldering, welding or the like, to balance cross 28. The band passes over the arcuate bend 36 of balance cross 28, extends through the central passageway 42 formed in zero regulator 26 substantially along the axis of rotation of coil assembly 12, and then passes over the arcuate upper end of a resilient mounting member 44 forming a part of the stator structure of the instrument. Member 44 is secured to zero regulator 26 by any appropriate means, and the right-hand end of band 24 is secured to member 44 as indicated at 46 by means such as soldering, welding or the like.

The member 44 is resiliently bent (to the left as viewed in FIG. 3), thereby placing the band 24 under tension as it extends between stator and rotor substantially along the axis of rotation of coil assembly 12, and is embedded over a portion of its length in a recess which itself forms in the soft material of anchor plate 22. When coil assembly 12 is caused to rotate about its axis of rotation by the passage of current therethrough, the free length of band 24, to wit, that portion of band 24 extending between balance cross 28 and resilient member 44, twists and exerts and exerts a torsion force in opposition to the rotation of the coil assembly. When the torsional force of band 24 equals the electromagnetic force causing coil assembly 12 to rotate, the coil assembly reaches an equilibrium position, that position thus corresponding to the magnitude of the test current.

Figure 1:
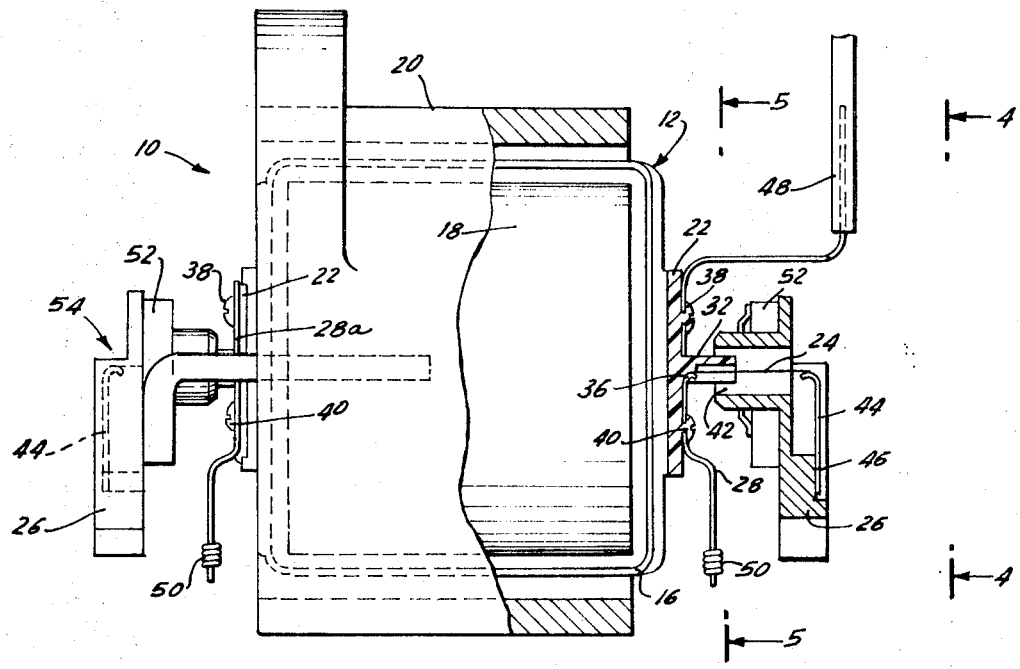
FIG. 1 is a side elevation, partly broken away and partly in section, of an electrical measuring instrument embodying features of the present invention.

As shown in FIGS. 1 and 4, a pointer 48 may be secured to the upper end of balance cross 28 and as the latter rotates along with coil assembly 12, the position of the former indicates the value of the test current. In another possible arrangement, a reflecting surface may be secured to the free length of band 24 and a beam of light may be incident thereon. The reflected beam which corresponds to the amount of twisting of band 24, may be incident on a dial to provide an indication of the test current magnitude. A balance weight 50 may be secured to the lower end of balance cross 28, if required, to ensure the return of band 24 and coil assembly 12 to a zero or rest position when the test current input is removed.

Zero regulator 26 may be secured to a mounting bracket 52 which in turn is secured to a fixed external mounting member (not shown). The other (left-hand as viewed in FIG. 1) end of coil assembly 12 may be mounted to a second external stator assembly by a torsion band mounting assembly similar to that described above, except that a plate 28a is used instead of the pointer-carrying balance cross 28. Elements of assembly 54 visible in FIG. 1, corresponding to the elements in the above described right-hand mounting assembly, are designated by corresponding reference numerals.

In a typical coil mounting assembly, the balance cross 28 and plate 28a are formed of resilient, half-hard brass, and the soft material anchor plate 22 is formed of polypropylene oxide (PPO). Other materials can be substituted for these so long as the force exerted on the band 24 by the balance cross 28 or plate 28a is sufficient to press band 24 into the anchor plate 22 and form a recess in situ.

An improved coil assembly suspension system for use in an electrical measurement instrument is thus provided which is effective to markedly increase the accuracy of the instrument. It does this by substantially eliminating relative movement between the torsion band and the coil assembly by causing the band itself to form a recess in situ in a mounting element secured to the coil assembly, in which recess the band is snugly pressed and received.

Accurate correspondence between the coil assembly and the band is thus ensured without the need for precise, and thus costly, fabricating techniques. The accuracy of measurement provided by an electrical measuring instrument in which the suspension system of the present invention is incorporated is in the range of one-half percent, while comparable instruments in which the band is free to slightly shift with respect to the coil assembly, are commonly accurate only to approximately two to three percent. Thus a significant increase in the accuracy of measurement is obtained by a relatively inexpensive, and yet reliable construction.

While only a single embodiment of the present invention is here specifically disclosed, it will be apparent that many variations may by made therein, all within the scope of the instant invention.

I claim:

1. In an electrical instrument comprising a stator, a rotor, and means for causing the latter to rotate relative to the former; means for rotatably mounting said rotor on said stator comprising a stator mounting element, a rotor mounting element, and a torsion band secured to and tensioned between said elements, one of said elements comprising a part formed of relatively soft-self-sustaining material, said torsion band being formed of relatively hard material and overlying said part of said element, and means operatively connected to said band and effective to urge said band against said part with force sufficient to cause said band to form a recess in said part in which recess said band is thereby snugly received.

2. The electrical instrument of claim 1, in which said one of said elements is said rotor.

3. The electrical instrument of claim 2, in which said part is formed of plastic and said band is formed of metal.

4. The electrical instrument of claim 2, in which said part and said urging means each comprise an arcuate segment located adjacent one another, said band passing between said arcuate segments, said recess being forced in the arcuate segment of said part.

5. The electrical instrument of claim 1, in which said one of said elements is said rotor, said urging means comprising a resilient member of relatively hard material mounted on said part, extending over said part with said band located between said member and said part, and active to press said band into said part.

6. The electrical instrument of claim 5, in which said part is formed of plastic and said band is formed of metal.

7. The electrical instrument of claim 1, in which said one of said elements is said rotor, said part thereof defining an end-facing surface thereof, said band extending along said surface and there forming a recess.

8. The electrical instrument of claim 6, in which said part is formed of plastic and band is formed of metal.

9. The electrical instrument of claim 1, in which said one of said elements is said rotor, said part thereof defining an end-facing surface thereof, said band extending along said surface and there forming said recess, said urging means comprising a resilient member of relatively hard material mounted on said part, extending over said surface with said band located between said member and said surface, and active to press said band into said surface.

10. The electrical instrument of claim 9, in which said surface and said member each comprise an arcuate segment located adjacent one another, said band passing between said arcuate segments, said recess being forced in the arcuate segment of said surface.

11. The electrical instrument of claim 9, in which said surface is formed of plastic and said band is formed of metal.

12. The electrical instrument of claim 1, in which said one of said elements is said rotor, said urging means comprising a resilient member of relatively hard material mounted on said part, extending over said part with said band located between said member and said part, and active to press said band into said part, said resilient member having an upper section extending outwardly from said part, said band extending along said section as it goes from said rotor to said stator.

13. The electrical instrument of claim 12, in which said surface and said member each comprise an arcuate segment located adjacent one another, said band passing between said arcuate segments, said recess being forced in the arcuate segment of said surface.

14. The electrical instrument of claim 12, in which said part is formed of plastic and said band is formed of metal.

15. The electrical instrument of claim 1, in which said one of said elements is said rotor, said part thereof defining an end-facing surface thereof, said band extending along said surface and there forming said recess, said urging means comprising a resilient member of relatively hard material mounted on said part, extending over said surface with said band located between said member and said surface, and active to press said band into said surface, said resilient member having an upper section extending outwardly from said part, said band extending along said section as it goes from said rotor to said stator.

16. The electrical instrument of claim 5, in which said surface and said member each comprise an arcuate segment located adjacent one another, said band passing between said arcuate segments, said recess being forced in the arcuate segment of said surface.

17. The electrical instrument of claim 15, in which said part is formed of plastic and said band is formed of metal.

18. The electrical instrument of claim 1, in which said one of said elements is said rotor, said urging means comprising a resilient member of relatively hard material mounted on said part and having an upper section extending outwardly from said part, said band extending along said section as it goes from said rotor to said stator.

19. The electrical instrument of claim 1, in which said one of said elements is said rotor, said part thereof defining an end-facing surface thereof, said band extending along said surface and there forming said recess, said urging means comprising a resilient member of relatively hard material mounted on said part and having an upper section extending outwardly from said part, said band extending along said section as it goes from said rotor to said stator.

20. The electrical instrument of claim 1, in which said part is formed of plastic and said band is formed of metal.

21. The electrical instrument of claim 1, in which said part and said urging means each comprise an arcuate segment located adjacent one another, said band passing between said arcuate segments, said recess being forced in the arcuate segment of said part.